Figures 1, 2:
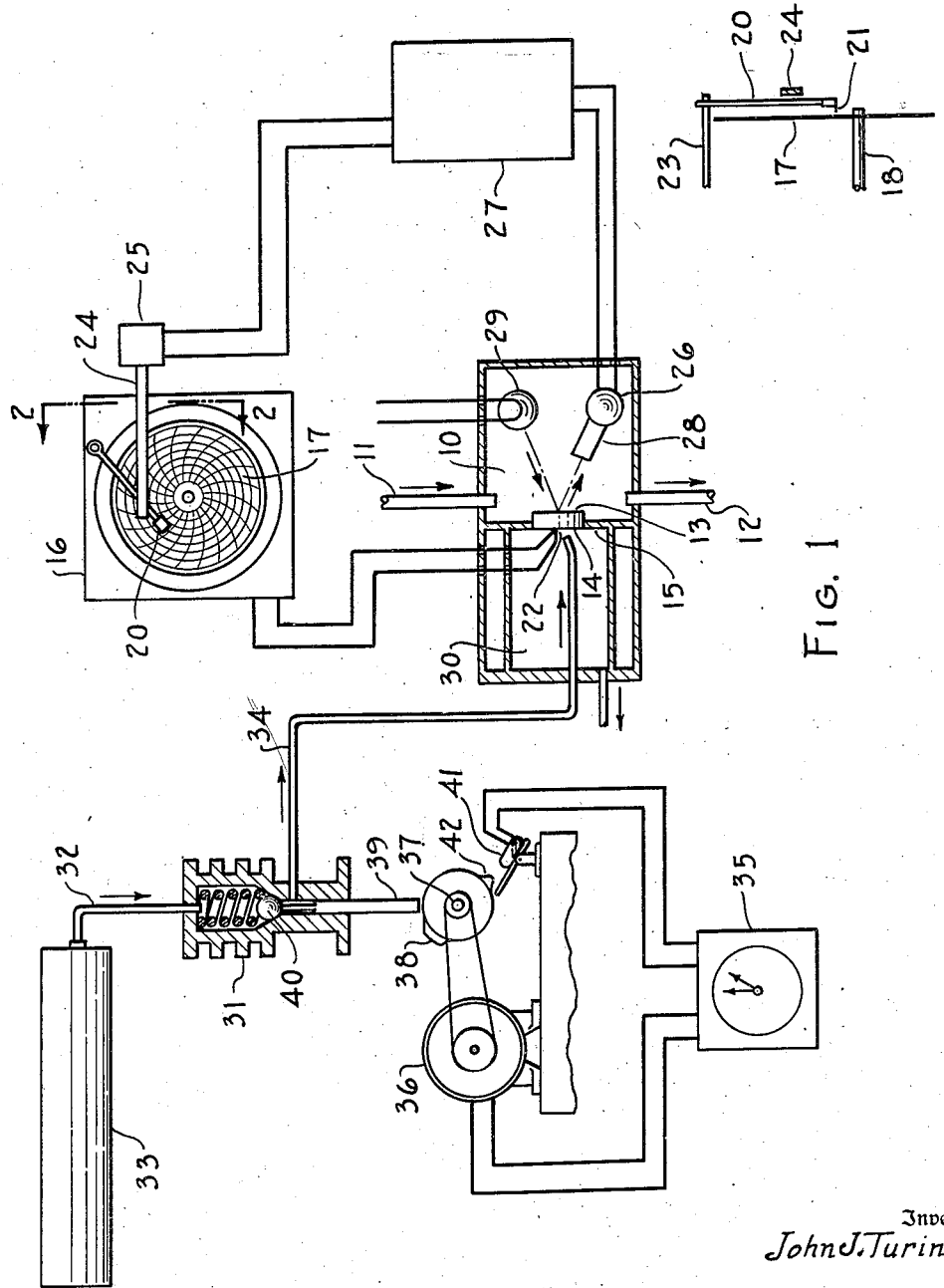

May 15, 1945. J. J. TURIN 2,376,209
DEW POINT INDICATOR
Filed April 14, 1944

Inventor
John J. Turin

By
Charles A. Lind
Attorney

Patented May 15, 1945

2,376,209

UNITED STATES PATENT OFFICE 2,376,209

DEW POINT INDICATOR

John J. Turin, Ottawa Hills, Ohio, assignor to Surface Combustion Corporation, Toledo, Ohio, a corporation of Ohio Application April 14, 1944, Serial No. 531,104

3 Claims. (Cl. 73—17)

This invention relates to an instrument for automatically ascertaining the dew point of a moisture-containing gas and has for its object to provide an improved instrument of this type.

For a consideration of what I believe to be novel and my invention, attention is directed to the following specification and the claims appended thereto.

In the accompanying drawing,

Fig. 1 is a diagrammatic view of a dew point indicating apparatus embodying the present invention, and Fig. 2 is a diagrammatic sectional view on line 2—2 of Fig. 1.

The gas whose dew point is to be ascertained is caused to flow through a testing chamber 10 by way of inlet and outlet pipes 11 and 12. Openly exposed to the gas in this chamber is a reflecting surface 13 which will ordinarily consist of a metal button 14 mounted in a wall 15 of the chamber.

16 indicates a recording meter which includes a chart disc 17 rotated in the usual manner by a chart-driving shaft 18. The circles on this chart indicate temperatures. Thus the innermost circle may indicate, say, —20° F. and the outermost circle may indicate, say, 60° F. Mounted for rocking movement in front of the disc chart 17 is an arm 20 having at its free end a punch pin or needle 21 which normally does not touch the chart 17. The position of this arm is controlled by the temperature of the reflecting button 14 through any preferred instrumentalities but which will usually comprise a thermocouple 22 at said button, it being understood that the needle arm is mounted on a rock shaft 23 whose turning is controlled by the said instrumentalities.

As soon as the dew point of the said gas has been obtained the needle end of the arm 20 is deflected towards the chart disc by means including a striker bar 24 to cause the needle 21 to touch the chart to prick the same or to leave an ink spot thereon as may be preferred.

The means for operating the striker bar 24 comprises an electrical device 25 whose operation is controlled by a photoelectric cell 26 through suitable instrumentalities including a current amplifier 27, the general arrangement being such that the striker 24 bar will be operated to strike the needle arm 20 at the instant that any condensation of moisture on the reflecting surface 13 disappears therefrom following a previous chilling of said surface to cause a condensation of moisture thereon from said gas, it being understood that the photoelectric cell is actuated by light reflected from said surface. The light limiting or receiving tube of the photoelectric cell is indicated at 28 and the source of light at 29.

The reflecting surface 13 is periodically chilled to cause periodic depositions of moisture thereon from the gas in the chamber 10 to obtain periodic readings or indications of the dew point of said gas. This chilling of said surface 13 is readily effected by liberating compressed carbon dioxide in an expansion chamber 30 to which the back side of the said surface is openly exposed. A periodically operated expansion valve is indicated at 31. A pipe 32 leads to this valve from a bottle 33 of compressed carbon dioxide and a pipe 34 leads into the expansion chamber 30 from said valve. The periodic opening and closing of the valve 31 is controlled by a timing mechanism 35 which controls the operation of an electric motor 36 which turns a shaft 37 having thereon a cam 38 which operates against a valve stem 39 for temporarily opening a ball valve 40 in the flow passage between the pipes 32 and 34. The timing mechanism is shown as comprising a mercury switch 41 which is tripped by a cam 42 on the shaft 37.

The apparatus has been designed primarily for ascertaining the dew point of atmospheres used in the heat treatment of metals but, of course, is not limited in its application to such use.

What I claim as new and desire to secure by Letters Patent is:

1. In apparatus for ascertaining the dew point of a moisture-containing gas, the combination which comprises a reflecting surface openly exposed to said gas, a movable element, means for changing the position of said element in accordance with changes in temperature of said surface, means for momentarily chilling said surface to cause momentary condensation thereon of moisture in said gas, a source of light to which said surface is exposed, means for changing light variations from said surface caused by the said condensation into electrical variations, and means controlled by said electrical variations for imparting to said movable element an effect which will indicate that a light variation has taken place.

2. In apparatus for ascertaining the dew point of a moisture-containing gas, the combination which comprises a reflecting surface openly exposed to said gas, a movable element, means for changing the position of said element in accordance with temperature changes of said surface, means for periodically momentarily chilling said surface to cause periodic momentary condensation thereon of moisture in said gas, a source of light to which said surface is exposed, means for changing light variations from said surface caused by the said condensation into electrical variations, and means controlled by said variations for momentarily imparting to said movable element an effect which will indicate that a light variation has taken place.

3. In apparatus for ascertaining the dew point of a moisture-containing gas, the combination which comprises a reflecting surface openly exposed to said gas, a movable element, means for changing the position of said element in accordance with changes in the temperature of said surface, means for momentarily chilling said surface to cause momentary condensation thereon of moisture in said gas and including a means for contacting the back side of said surface with a refrigerant, a source of light to which said surface is exposed, means for changing light variations from said surface caused by the said condensation into electrical variations, and means controlled by said electrical variations for imparting to said movable element an effect which will indicate that a light variation has taken place.

JOHN J. TURIN.